United States Patent [19]

Guptil et al.

[11] 4,280,722
[45] Jul. 28, 1981

[54] HOSE CLAMP

[75] Inventors: Richard A. Guptil, Waynesville; Ivan Gaster, Hazelwood; Roger D. Meadows, Waynesville, all of N.C.

[73] Assignee: Dayco Corporation, Dayton, Ohio

[21] Appl. No.: 65,400

[22] Filed: Aug. 10, 1979

[51] Int. Cl.³ .................. F16L 33/00; F16L 47/00; F16L 49/00
[52] U.S. Cl. ..................... 285/244; 29/450; 24/27
[58] Field of Search ............. 29/450, 453; 285/243, 285/244, 260; 24/73 C, 27

[56] References Cited

U.S. PATENT DOCUMENTS

| | | | |
|---|---|---|---|
| 2,069,691 | 2/1937 | Wilson et al. | 24/27 UX |
| 2,524,562 | 10/1950 | Dawbarn | 24/27 UX |
| 3,729,027 | 4/1973 | Bare | 285/244 X |
| 4,010,518 | 3/1977 | Rejeski et al. | 24/73 C |
| 4,099,298 | 7/1978 | Gimenez | 24/27 |

Primary Examiner—Charlie T. Moon
Attorney, Agent, or Firm—Charles E. Bricker

[57] ABSTRACT

A clamp for reinforced flexible hose made of a continuous member which is attached to the reinforcement at one or both ends of the hose. Application of force to the clamp expands the hose end to permit insertion or removal of an adjacent member, such as a coupling or fitting.

9 Claims, 6 Drawing Figures

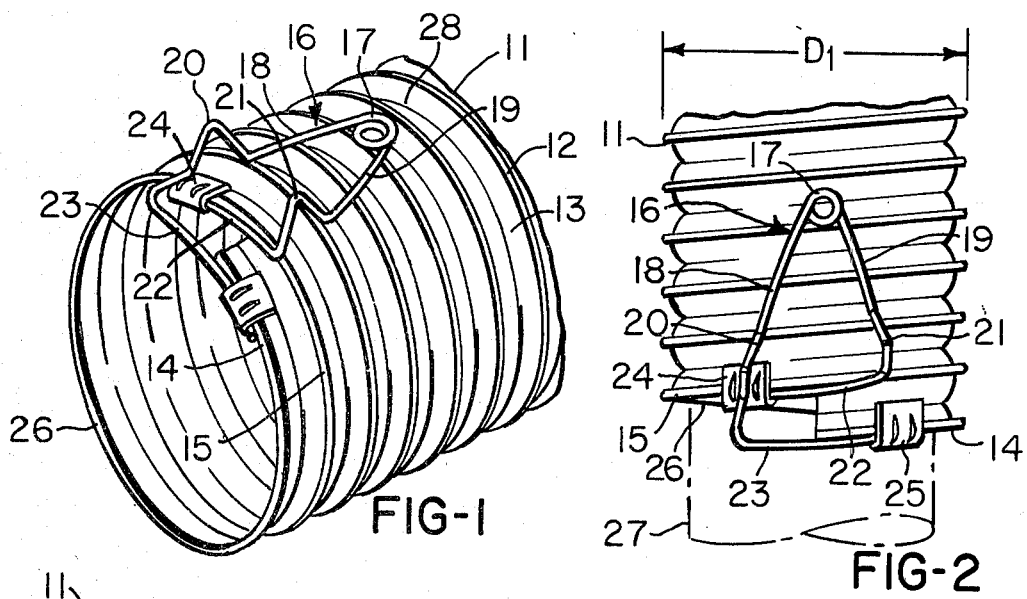
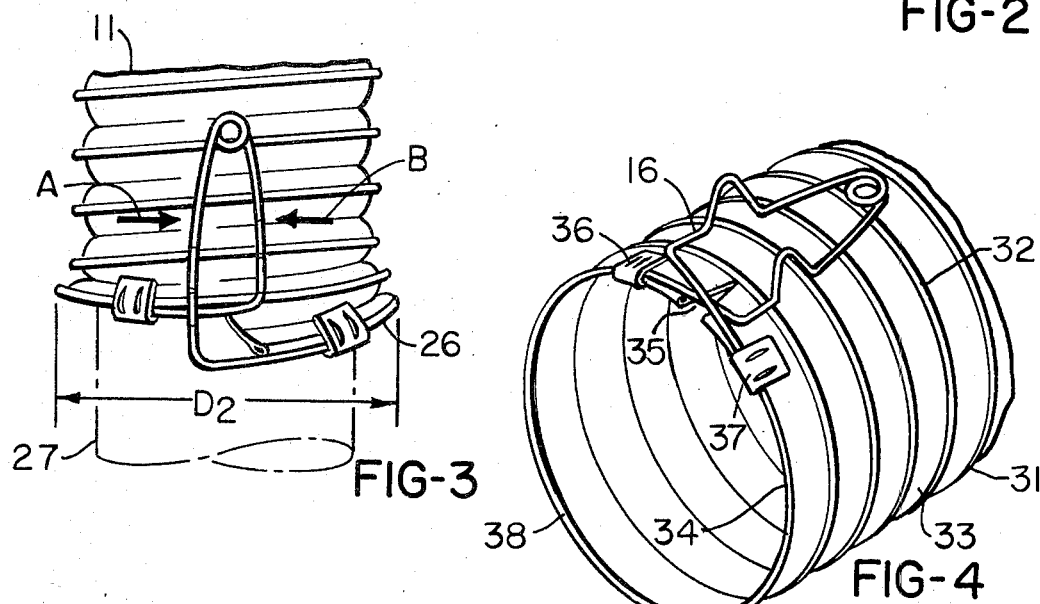
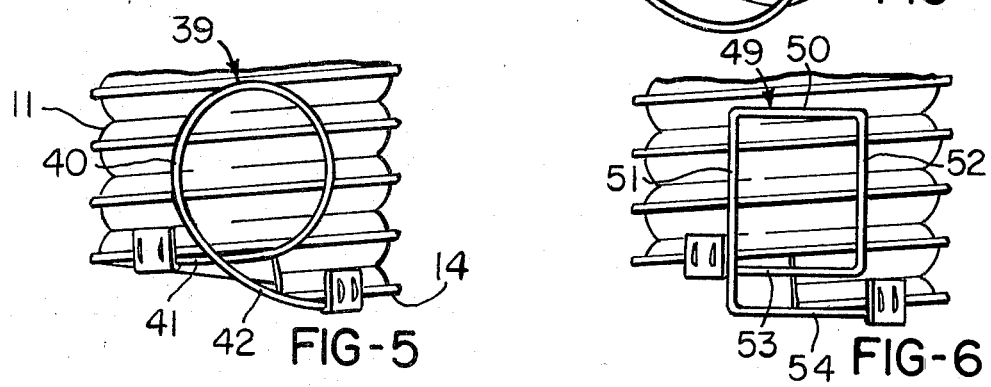

HOSE CLAMP

BACKGROUND OF THE INVENTION

The present invention relates to a clamp for a flexible low pressure hose, and specifically a clamp of the type which is permanently secured to the hose. The hose normally consists of a reinforcing member which is a continuous helically wound coil having spaced turns, covered by an outer tube made of polymeric material. Such a hose is generally used for conveying air under low pressure. The tube may be extruded or formed of a helical strip which is continuously formed over the reinforcing member. It is also possible to make a hose of this type by using a reinforcement of longitudinally spaced annular turns. The clamp is secured to the reinforcing member in such a manner that the end of the hose may be expanded when it is desired to place the end of the hose over an adjacent tubular member such as a fitting, flange, coupling or duct.

SUMMARY

While clamps secured to the hose have been previously known, such clamps are often cumbersome to operate and are expensive to manufacture. Examples of such clamps are found in U.S. Pat. No. 3,276,089, issued to Cheever et al, and U.S. Pat. No. 3,874,712, issued to Watson. In both of these patents, the clamp is so designed tht it must be loosened to allow the end of the hose to be placed over the adjacent member, then tightened to lock the hose in place over the member.

According to the present invention, the clamp is secured to the hose and in its normal position it applies radially inward pressure to the hose against the member or fitting on which the hose is placed. In order to remove the hose from the member, or in order to install it on the member, it is only necessary to manipulate the clamp in order to expand the end of the hose and enlarge the diameter of the end. This is done by simply pressure of the fingers against portions of the clamp, and releasing the pressure which returns the hose end to its normal diameter as it is mounted on the member or fitting.

It is a principle feature of the present invention, therefore, to provide a clamp which is secured to a hose in such a manner that the hose may be placed over an adjacent member without the need for complicated manipulation of the clamp.

It is a further feature to provide a clamp to which simple finger pressure may be applied to expand the end of the hose for mounting on an adjacent member.

It is a further feature of this invention to form such a clamp out of a single piece of wire to provide a device which is inexpensive to manufacture.

It is a further feature of this invention to provide a clamp which may be easily secured to the end of the hose.

Further details, features, uses, objects and advantages of this invention will be readily apparent from the embodiments set forth below in the specification, drawings and claims.

BRIEF DESCRIPTION OF THE DRAWINGS

FIG. 1 is a perspective view of the invention illustrating a typical hose and novel clamp assembly;

FIG. 2 is a plan view of the hose of FIG. 1, further illustrating the relationship of the clamp to the hose while the hose is installed over an adjacent member;

FIG. 3 is a view similar to FIG. 2, illustrating a condition during which the clamp has been manipulated to expand the end of the hose in order to install the hose on, or remove it from, an adjacent member;

FIG. 4 is a view similar to FIG. 1, illustrating a further embodiment of the invention;

FIG. 5 is a view similar to FIG. 2, illustrating a modified form of clamp; and

FIG. 6 is a view similar to FIG. 2, illustrating a further modified form of clamp.

DESCRIPTION OF THE PREFERRED EMBODIMENT

Referring to FIGS. 1–3, a hose and clamp assembly are illustrated consisting of a hose 11 having 1 helically wound reinforcing member 12 which consists of a number of longitudinally spaced coils or turns. This reinforcing member is normally made of a spring wire which may be bare or covered according to the construction of the hose and the end use thereof. Surmounting the member 12 is a tube or covering 13, which may be either an extruded tube or formed in a strip which is helically wrapped around the reinforcing member. In order to enhance the flexibility of such a hose, it has a generally corrugated configuration, the corrugations being designated by reference numeral 28.

The clamp 16 is adapted to be mounted at the end 26 of the hose and is formed of a single piece of wire. A typical wire may be 0.06 gage music wire which has spring characteristics. The wire is formed generally in the shape of a triangle and is looped about itself midway thereof to form a biasing spring loop 17 at the apex of the triangle. The legs 18 and 19 of the triangle are maintained at a equilibrium by the biasing effect of the loop. The legs 18 and 19 each have offset members 20 and 21 which may be of any desired configuration in order to permit the clamp to be squeezed by fingers to perform its desired function. The ends of the legs are turned inwardly toward each other to complete the triangle and these ends are designated by numerals 22 and 23. These ends are secured to the hose by any desired means and typically by use of crimping devices 24 and 25 which serve to provide a good attachment to the turns of the reinforcement as shown in the drawings. The end 23 is secured by the crimping device 25 to the free end of the outermost turn 14, while the end 22 is secured by crimping member 24 to the next adjacent turn 15 in the position shown in FIGS. 1 and 2. The clamp is generally mounted in a plane which is parallel to the longitudinal axis of the hose, as shown in the drawings, and this arrangement is the most practical from a space-saving standpoint. However, the device will function equally as well if rotated 90 degrees so that the plane of the clamp extends radially outward of the hose.

The entire hose, including the end 26, has a nominal inside diameter designated as $D_1$. The biasing effect of the clamp, particularly by virtue of the loop 17, will also maintain this diameter at the end 26 of the hose. When it is desired to place the hose over an adjacent member or fitting, such as shown by reference number 27, or if the hose is already mounted on member 27 and it is desired to remove the hose, force is applied to the offset members 20 and 21 so that they have motion toward each other in the directions designated by arrows A and B, as shown in FIG. 3. This may be done, for example, by placing a forefinger and thumb against the offset portions 20 and 21 and squeezing toward each other. This transmits the force through the legs 18 and 19, then through the ends of the legs 22 and 23 and then through the coils to which these ends are attached. This results in radially expanding the coils and hose so that the hose end 26 expands beyond diameter $D_1$ and assumes the diameter $D_2$, thereby freeing it for insertion on or removal from the member 27. By relaxing the finger and thumb, the force is released so that the hose end returns to the nominal diameter $D_1$, thus frictionally contacting the member 27.

MODIFICATIONS

FIG. 4 illustrates a modified form of the invention employing a hose 31 similar to hose 11, having a reinforcing member 32 and a cover tube 33. The reinforcing member 32, however, instead of being a continuous helical reinforcement, consists of a series of individual annular rings over which the cover has been placed. The clamp 16 is secured to the endmost ring 34, this ring being severed to create a small gap 35 so that it is discontinuous in this embodiment. The ends of the clamp are secured by crimping members 36 and 37 to the same ring but on either side of the gap. The FIG. 4 embodiment is similar to FIG. 1 in that the hose is illustrated as having its end diameter the same as the diameter of the remainder of the hose so that it may be mounted on an adjacent member. Squeezing together the offset portions 20 and 21, as described above, will accomplish the same desired result; namely, by forcing apart the severed portions of the ring 34, the end of the hose will be expanded radially outward in order to permit removal or installation on an adjacent member.

It should not be inferred that the generally triangular shape of clamp illustrated in FIGS. 1-4 is the only shape that is feasible. The novel concept may be carried out by other shapes which accomplish the same result. FIG. 5 is one such example; in this form the clamp 39 is a generally circular loop 40, terminating in ends 41 and 42 which are crimped to the turns of the hose in the manner described above. Although illustrated as circular, this loop may be generally elliptical, the flatness of the ellipse varying with the desired pressure. Squeezing the sides of the loop will accomplish the desired result of expanding the hose end, as described above.

Similarly, the clamp 49 illustrated in FIG. 6 may be in a generally rectangular shape, being formed of sides 50, 51 and 52, and terminating in ends 53 and 54 which are crimped to the turns of the hose as described above. The sides 51 and 52 may be squeezed together to expand the hose end, as described above.

Both the FIGS. 5 and 6 forms of the invention are shown in a plane generally parallel to the longitudinal axis of the hose, but may be rotated 90 so that they extend radially outward of the hose, as has been discussed with reference to the principal embodiment. Actually, all forms of the clamp may be located at any angle with respect to the hose in order to accomplish the desired purpose, the only criterion being space savings.

It should be noted that although the embodiments illustrated present a corrugated hose, the corrugated form is not mandatory. It is specifically contemplated to make the hose of a smooth exterior, if such a design is desirable for specific uses.

As indicated above, the tubes 13 and 33 are made of polymeric materials, such as rubber, vinyl, polyethelene, EPDM or any other material which is sufficiently flexible to accomplish the purpose.

The clamp is shown secured to one end of the hose, but it should be understood that it may be secured at both ends, if desired.

The above illustrations are exemplary and other modifications, may be utilized while remaining within the scope of the claims set forth below:

I claim:

1. In combination, a flexible hose of nominal diameter having a reinforcing member comprising a plurality of longitudinally spaced turns of a continuous helically wound coil and a cover tube, and a clamp, said clamp being a continuous wire member having one end thereof secured to the endmost turn of said coil and the other end thereof secured to the adjacent turn of said coil, said clamp having means to maintain said hose end at said nominal diameter, and portions of said clamp being adapted for motion relative to each other to move apart said ends of said wire of said clamp secured to said turns of said coil and to radially expand said hose end.

2. In combination, a flexible hose of nominal diameter having a reinforcing member comprising a plurality of longitudinally spaced annular rings and a cover tube, the endmost ring of said hose having a gap, and a clamp, said clamp being a continuous wire member, the ends of said clamp being secured to said endmost ring at opposte sides of said gap, said clamp having means to maintain said hose end at said nominal diameter, portions of said clamp being adapted for motion relative to each other to move apart said ends of said wire of said clamp secured to said endmost ring at opposite sides of said gap and to radially expand said hose end.

3. The hose of claims 1 or 2 in which said clamp is formed of a single piece of spring wire.

4. The hose of claims 1 or 2 in which said clamp ends are secured by crimping onto said hose.

5. The hose of claims 1 or 2 in which said clamp is approximately in the shape of a triangle.

6. The hose of claim 5 in which said clamp is a continuous single-piece wire looped about itself approximately midway thereof to form biasing means at the apex of said triangle forcing the legs of the triangle outwardly from each other and maintaining said end at said nominal diameter.

7. The hose of claim 6 in which said legs are adapted to be forced toward each other to radially expand said hose end.

8. The hose of claims 1 or 2 in which said clamp is generally in the shape of a rectangle.

9. The hose of claims 1 or 2 in which said clamp is generally circular in shape.

* * * * *